J. N. VALLEY.
ELEVATED RAILROAD.
No. 11,158. Reissued Apr. 21, 1891.
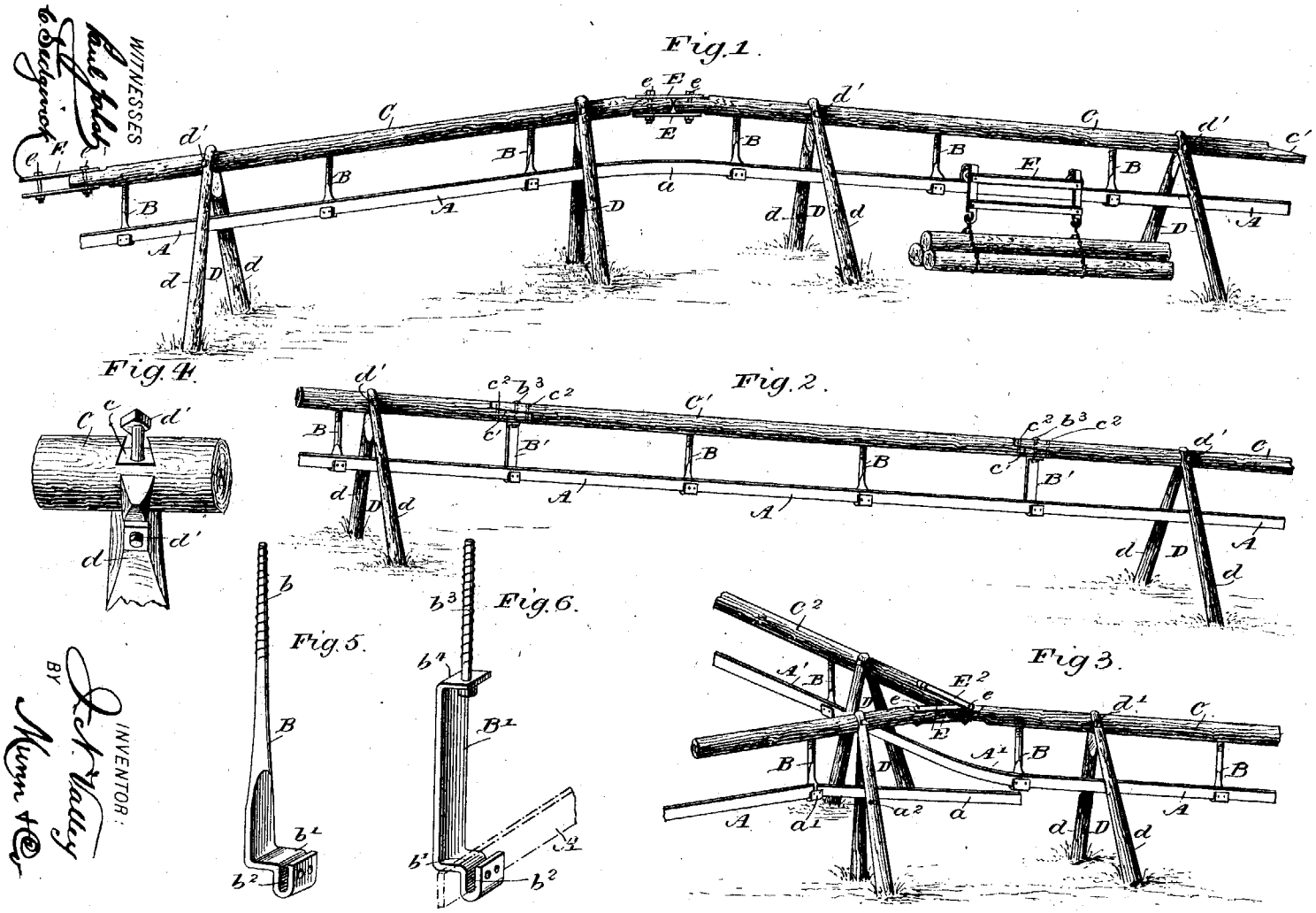
WITNESSES
Paul Jolst
C. Sedgwick
INVENTOR:
J. N. Valley
BY
Munn & Co
ATTORNEYS
THE NORRIS PETERS CO., PHOTO-LITHO., WASHINGTON, D. C.

UNITED STATES PATENT OFFICE.

JOHN NAPOLEON VALLEY, OF JERSEY CITY, NEW JERSEY.

ELEVATED RAILROAD.

SPECIFICATION forming part of Reissued Letters Patent No. 11,158, dated April 21, 1891.

Original No. 428,871, dated May 27, 1890. Application for reissue filed October 25, 1890. Serial No. 369,376.

*To all whom it may concern:*

Be it known that I, JOHN NAPOLEON VALLEY, of Jersey City, in the county of Hudson and State of New Jersey, have invented a new and Improved Elevated Railroad, of which the following is a full, clear, and exact description.

My invention relates to elevated railroads, more especially of that class adapted for use in timber-lands for getting out logs, or in mines for transporting coal, ores, or refuse, or in other situations for other purposes; and the invention has for its object to provide a simple, inexpensive, durable, and efficient railroad of this character.

The invention consists in certain novel features of construction and combinations of parts of the elevated-railroad structure, all as hereinafter described and claimed.

Reference is to be had to the accompanying drawings, forming a part of this specification, in which similar letters of reference indicate corresponding parts in all the figures.

Figure 1 is a perspective view of a portion of an elevated railroad constructed in accordance with my invention. Fig. 2 is a perspective view of another portion of the railroad, illustrating how a ravine may be bridged over by it. Fig. 3 is a perspective view of part of the railroad, illustrating how switches may be constructed to connect with the main track. Fig. 4 is a detail plan view drawn to a larger scale, and showing more clearly the manner of joining the longitudinal rail-supporting stringers to the struts; and Figs. 5 and 6 are perspective views of two forms of hangers which support the rail from the stringers.

The single rail or track A of my improved railroad is supported by hangers B or B′ from overhead longitudinally-ranging stringers C or C′, which themselves are sustained at suitable height by downwardly-diverging pairs of posts *d d*, forming struts D, which are set upon or into the ground. The strut-posts *d d* are rigidly connected to the stringers C, and preferably by making downwardly-diverging dovetail-shaped mortises *c c* in the opposite sides of the stringers and cutting the upper ends of the strut-posts correspondingly to fit snugly into the mortises, and then passing a bolt *d′* through the tops of the struts and the stringer, as will be more clearly understood from Fig. 4 of the drawings, wherein one strut-post *d* is removed the better to show the shape of the stringer-mortises and the fastening-bolt. Any other suitable strong direct connection of the stringer and struts may, however, be adopted.

Where the track A is to be curved more or less quickly to the right or left hand without using a switch, the ends of the adjacent or successive stringers are pivotally connected by two metal links E E, applied one on top of and the other below the two stringers and held thereto by suitable pivot bolts or pins *e e*, each passed through both links and one of the stringers, as most clearly shown in Fig. 1 of the drawings. This construction allows the track A to be curved to the right or left hand to carry it along between standing trees, when the railroad is built in timber-lands, for getting out the logs, which will be swung in any approved manner from a car or trolley F, having wheels which run on the track A, as illustrated also in Fig. 1 of the drawings.

In all ordinary stretches of track wherein the successive stringers C are connected together by pairs of links E, as above described, I may prefer to use the style of track-hanger B. (Shown in Fig. 5 of the drawings.) This hanger is made with a screw-stem *b*, which is turned directly into or through the stringer from the under side, and is provided at its lower end with a lateral offset *b′* of a couple of inches in width, and outside this offset the hanger is bent downward and then upward to form a hook $b^2$ of about two inches in depth, and into which the track-rail A, which is about three inches wide, will be placed edgewise and bolted fast.

The track-supporting stringers C will be made of logs or timbers, usually about thirty feet long, and the struts D will be connected to each stringer log or section, preferably several feet from both ends of it. This gives ample support to the overhanging ends of the stringers, which are connected by the links and bolts E *e*, and also gives space between the two struts nearest the link-joint to allow free passage of the loaded trolley F, running on the track. However, the track and stringers may be bent or curved laterally at and below the link-joints of the stringers.

When the railroad structure is to cross ravines or ditches of considerable width, and also where comparatively long straight stretches of track are required, I prefer to use alternate stringers C′, the opposite ends of which are halved at $c'$ upon the ends of the stringers C, which are sustained directly by two struts D D. Two pairs of struts D, which sustain two stringers C, are thus also made to support the third intermediate stringer C′, which thus, with the ends of the two stringers C C, which project beyond the inner or adjacent two struts D, which support them, would, were the stringer C′ thirty feet long, give a total length of about forty feet between the two struts and allow the railroad to be spanned over or across a ravine or ditch of that width. (See Fig. 2 of the drawings.)

The splice-joints $c'$ between the stringers C C′ are preferably made with squared abutting end shoulders and inclined intermediate portions, and near each end these joints are bound together by a wooden pin or dowel $c^2$, and between the two pins or dowels is screwed into the stringer-joint from the under side the bolt or screw $b^3$, by which the hanger B′, which is preferably used at these spliced joints, is held to the stringers. These hangers B′ (shown in Fig. 6 of the drawings) are preferred at the joints $c'$, because the bolt $b^3$, on which the hanger is sustained, passes through a lateral lug $b^4$ at the top of the hanger, and by screwing the bolt into the joint, so as to bind this lug fast to the under side of the stringer, the lug and bolt constitute a clamp which greatly strengthens the joint of the stringers. The hangers B′, like the ones B, each have the lateral offset and hook $b'$ $b^2$ to sustain the track-rail A and give clearance to the wheels of the car or trolley F past the track-hangers. If desired, the hangers B′ may be suspended by the joint-securing bolts $b^3$, so that the top lugs $b^4$ of the hanger will be entirely below or clear of the stringers, and with this construction the hangers B′ could be raised or lowered by turning their screws $b^3$ upward or downward in the stringer-joint, thus making the hangers B′ vertically adjustable, like the direct screw-stem hangers B, for leveling or vertically adjusting the track without disturbing the struts which sustain the entire superstructure.

The facility with which switches or turnouts of the track may be provided in my elevated railroad is illustrated in Fig. 3 of the drawings. The switch is connected at any one of the link-and-bolt joints E $e$ between two of the stringers C C, and consists of a switch-rail A′, which is suspended from an auxiliary stringer $C^2$, which is connected by a pair of pivot-bolted links $E^2$ with one of the stringers C, and it may be by one of the bolts $e$, holding the pair of links E E to the stringer. Near the link-joint the stringer $C^2$ is supported by a strut D, placed several feet from the joint. That part $a$ of the track A which is under the stringer-joint E $e$ is pivoted at $a'$ to one hanger B, and is adapted to be unfastened and swung upward from and clear of the adjacent hanger, and into the latter hanger the end of the switch-rail A′ is placed and fastened by a bolt or pin, and the switch is complete. The pivoted rail $a$ may be supported by a pin $a^2$, driven into the adjacent strut D, to hold the rail clear of the ground and out of the path of the car or trolley taking the switch. It is manifest that the switch may be run to either side in substantially the manner above described, it being extended to the right-hand side in the drawings. With this switch the outer end of the stringer $C^2$, which sustains the switch-rail A′, may, with the outer end of the rail, be moved laterally to either side, as the range of the turn-out track may require.

I specially mention the relative location of the link-joint of either the main or switch track-rails with the nearest hanger B, which supports the track from the stringers. By reference to both Figs. 1 and 3 of the drawings it will be seen that the link-joint at E or $E^2$ is not directly above the hanger or the point where the track-rail is held in the hanger. Hence as the main track of the switch-rail is turned off laterally to either side at a more or less sharp curve the tendency of the track will be to describe a gradual easy curve from the hanger B, and not to bend off too sharply or abruptly therefrom, as the center of motion of the overhead stringer is removed some little distance forward of the point of connection of the rail with the hanger. This construction gives an easier curve of the track for the car or trolley to run over and prevents injurious strains on the track and its supports.

I also specially mention the very simple, inexpensive, and substantial construction of my elevated railroad, which, considered fundamentally, comprises struts made of two downwardly and laterally diverging posts combined with a longitudinal rail-sustaining stringer fastened directly to and between the upper ends of the strut-posts. When not quite so broadly considered, the invention may be said to comprise the combination, in an elevated railroad, of the following elements, viz: struts formed of two downwardly-diverging posts, a longitudinal stringer fastened directly to the upper parts of said strut-posts, hangers on the stringer, and a track-rail supported on the hangers between the strut-posts and adapted to sustain a trolley or carriage which runs along the rail and between the diverging strut-posts. I am not aware of prior equivalent combinations of parts in an elevated-railroad structure.

Having thus described my invention, what I claim as new, and desire to secure by Letters Patent, is—

1. In an elevated railroad, a longitudinal rail-supporting stringer and supporting-posts therefor, the stringer being fastened directly to and between the upper ends of said supporting-posts, substantially as described.

2. In an elevated railroad, the combination, with struts formed of two downwardly and laterally diverging posts and a longitudinal stringer fastened directly to and between the upper ends of the strut-posts, of hangers held to the stringer, and a track-rail supported on the hangers between the strut-posts, substantially as described.

3. In an elevated railroad, the combination, with a track, hangers, and stringers to which the hangers are held to support the track, of struts sustaining the stringers and consisting of two laterally and downwardly diverging posts connected to the stringers by undercut or dovetail joints, substantially as herein set forth.

4. In an elevated railroad, the combination, with a track, hangers, and stringers to which the hangers are held to support the track, of struts sustaining the stringers and consisting of two laterally and downwardly diverging posts connected to the stringers by undercut or dovetail joints, and a bolt passing through the stringers and strut-posts, substantially as herein set forth.

5. In an elevated railroad, the combination, with a track, hangers, stringers to which the hangers are held to support the track, and struts sustaining the hangers, of links connecting the stringer-sections, substantially as described, whereby the road may be curved more or less sharply to either side, as and for the purposes set forth.

6. In an elevated railroad, the combination, with supporting-struts, stringers C C, extending at the ends beyond the struts and hangers, and a track on said stringers, of an intermediate stringer C′, held to the projecting ends of the stringers C C, and a track suspended from the stringer C′ and connecting with the track supported from the stringers C C, substantially as described, whereby three stringers are supported by two pairs of struts and ravines or ditches may be bridged by the track, as herein set forth.

7. In an elevated railroad, the combination, with struts and track-supporting stringers C C C′, sustained thereby and halved together at the ends, of pins $c^2$ $c^2$, passing across the halved joint, a hanger B′ at the joint and provided with an upper lug $b^4$, and a bolt $b^3$, passed through the hanger-lug and stringer-joint, substantially as described, for the purposes set forth.

8. In an elevated railroad, the combination of struts, stringers sustained thereby and linked together at the ends, hangers held to the stringers, and a track sustained by the hangers, the link-joint of the stringers and the adjacent hanger being out of line vertically, substantially as described, whereby as the stringer-joint is flexed to either side the track will keep an easy curve at and near the hanger, as and for the purposes set forth.

9. In an elevated railroad, the combination, with struts, stringers sustained thereby, hangers on the stringers, and a main track held in the hangers and having a portion detachable from one hanger, of a switch consisting of struts, a stringer supported thereby, hangers on this stringer, and a switch-rail sustained by the hangers and adapted to the adjacent main-track hanger, substantially as described, for the purposes set forth.

10. In an elevated railroad, the combination, with struts, stringers sustained thereby and linked together at the ends, and a main track held in the hangers and having a portion detachable from one hanger near the link-joint of the stringers, of a switch consisting of struts, a stringer supported thereby, links connecting this stringer with the link-joint of the main-track stringers, and a switch-rail sustained by hangers on the switch-stringer and adapted to the adjacent main-track hanger, substantially as described, for the purposes set forth.

JOHN NAPOLEON VALLEY.

Witnesses:
HENRY L. GOODWIN,
C. SEDGWICK.